United States Patent
Cohen et al.

(10) Patent No.: US 10,936,406 B2
(45) Date of Patent: Mar. 2, 2021

(54) MULTI CLOUD TRANSACTIONAL STORAGE FOR AVAILABILITY AND SECURITY

(71) Applicant: EMC IP Holding Company LLC, Hopkinton, MA (US)

(72) Inventors: Saar Cohen, Moshav Mishmeret (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 134 days.

(21) Appl. No.: 16/155,772

(22) Filed: Oct. 9, 2018

(65) Prior Publication Data

US 2020/0110658 A1    Apr. 9, 2020

(51) Int. Cl.
  *G06F 11/00* (2006.01)
  *G06F 11/10* (2006.01)
  *G06F 3/06* (2006.01)
  *G06F 11/14* (2006.01)

(52) U.S. Cl.
  CPC .......... *G06F 11/1004* (2013.01); *G06F 3/064* (2013.01); *G06F 3/067* (2013.01); *G06F 3/0617* (2013.01); *G06F 3/0659* (2013.01); *G06F 11/1443* (2013.01); *G06F 11/1474* (2013.01)

(58) Field of Classification Search
  CPC ............. G06F 11/1092; G06F 11/2094; G06F 11/1474
  See application file for complete search history.

(56) References Cited

U.S. PATENT DOCUMENTS

| | | | |
|---|---|---|---|
| 5,889,935 A * | 3/1999 | Ofek | G06F 11/2066 709/217 |
| 2008/0046493 A1 | 2/2008 | Rosenberg | |
| 2010/0169661 A1* | 7/2010 | Summers | G06F 21/80 713/189 |
| 2011/0126295 A1 | 5/2011 | Resch | |
| 2014/0245063 A1* | 8/2014 | Baptist | G06F 3/06 714/6.22 |
| 2017/0017581 A1* | 1/2017 | Huang | G06F 21/00 |

OTHER PUBLICATIONS

International Search Report and Written Opinion for PCT/US2019/041123 dated Sep. 27, 2019.

\* cited by examiner

*Primary Examiner* — Charles Ehne
(74) *Attorney, Agent, or Firm* — Workman Nydegger

(57) ABSTRACT

One example method includes exposing a block storage which is distributed across a group of multiple sites, receiving a primary write request that identifies data to be stored, separating data identified in the primary write request into multiple data pieces, encoding the data pieces by creating multiple new blocks of data based on the multiple data pieces, where the data pieces are encoded in such a way that when a sufficient number, but fewer than all, of the multiple new blocks of data are retrieved, the data identified in the write request is recoverable by decoding, and writing the new blocks of data to different respective sites of the group, where writing of the new blocks of data is performed in conjunction with a plurality of secondary write requests, each of which corresponds to one of the new blocks of data.

20 Claims, 3 Drawing Sheets

MULTI CLOUD TRANSACTIONAL STORAGE FOR AVAILABILITY AND SECURITY

FIELD OF THE INVENTION

Embodiments of the present invention generally relate to data security and availability. More particularly, at least some embodiments of the invention relate to systems, hardware, software, computer-readable media, and methods directed to processes for implementing data security and availability in a data protection environment, such as a cloud storage environment for example.

BACKGROUND

As enterprises create huge amounts of data, they are increasingly looking to cloud storage solutions to effectively capture and preserve this data. Cloud storage solutions are often attractive as they can be readily scaled to the needs of a particular user. Not only is the capacity of cloud storage solutions essentially limitless, but the user only pays for the amount of storage actually used. As well, cloud storage solutions require only limited infrastructure at the enterprise premises, thus reducing the cost and complexity of data management. Further, cloud storage solutions provide durability and reliability in the event of a problem at the enterprise premises.

In many cases, enterprise data stored in the cloud includes sensitive information. Such sensitive information may include, for example, business information, personal data, and medical records. Despite their various advantages, conventional cloud storage solutions may not provide the level of data security needed or desired to adequately protect sensitive information.

To illustrate, when there is a security breach on premises ("on prem") at the enterprise, the enterprise IT department may be able to mitigate data loss or corruption by physically disconnecting the network and blocking access to the data. In the cloud, however, the enterprise has no ability to block access to the data once the account has been compromised. Another problem with conventional cloud storage solutions is that because cloud based block storage is not as available as on-prem block storage, techniques such as local mirroring are also not possible as there is dependency between the disks.

Cloud data can be encrypted to provide some measure of protection against unauthorized access/use of the stored data. However, if an unauthorized party takes over a computer, or the entire environment in the cloud, encryption will not help prevent unauthorized access to the data. In particular, a rogue employee having access to the cloud account can access the raw data. If the data is encrypted-at-rest, then the rogue employee may be able to access the data through a machine in the cloud, and so bypass the encryption. Even if the data is encrypted at the source, getting the key is possible by taking control of a single machine, and then using the key to access the data directly from the block storage.

Finally, conventional cloud data storage solutions may be limited in terms of the availability of the data stored in the cloud. For example, a major outage in a single cloud blocks access to all the data. While eventual access of backups and replicas may be possible, there will be some downtime before data can be recovered.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
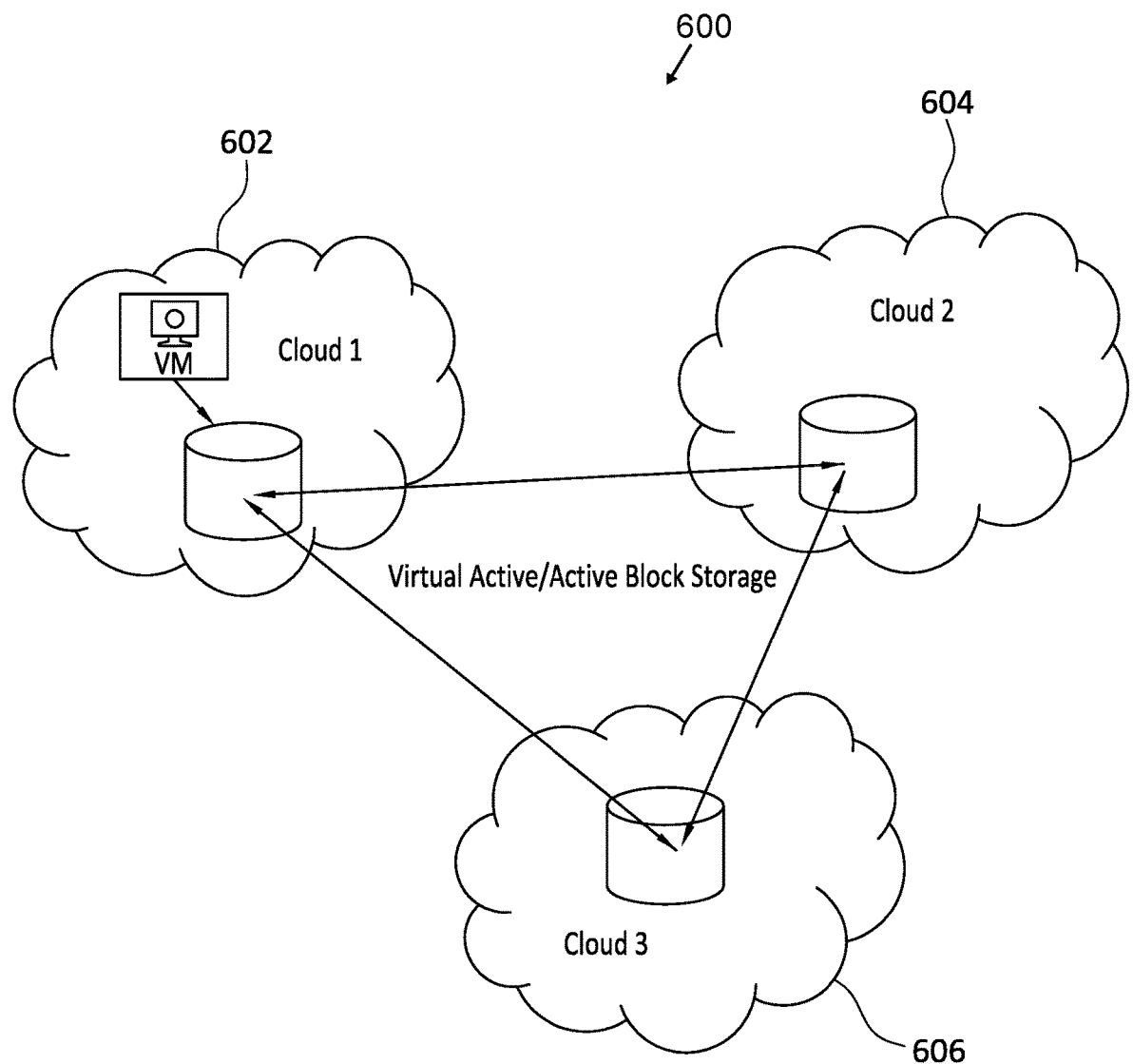
FIG. 1 discloses aspects of an example multi-site storage configuration.

Embodiments of the present invention generally relate to data availability. More particularly, at least some embodiments of the invention relate to systems, hardware, software, computer-readable media, and methods directed to processes for implementing data security and availability in a data protection environment, such as a cloud storage environment for example.

At least some embodiments of the invention are directed to a distributed block storage arrangement on multiple separate clouds. For certain example embodiments, three separate clouds are employed, although different numbers of clouds can be employed in other embodiments. For example, five separate clouds are used in another embodiment. The clouds will be in synchronous distance, and may, but need not, be public clouds such as the Amazon Web Service (AWS) cloud or the Microsoft Azure cloud, or private clouds, located at the premises of a customer. The clouds may comprise a combination of public and private clouds. The cloud storage that is exposed may be an active-active storage like the Dell-EMC VPLEX virtual computer data storage project for example, except that the format of the data will allow availability and security features such as those disclosed herein. Other types of cloud storage may alternatively be used however, and the scope of the invention is not limited to the VPLEX implementation.

In one illustrative embodiment, two pieces of data, A and B, that are to be stored are used as a basis to generate three corresponding pieces of data, such as P1, P2 and P3 for example, each of which may correspond to a different respective value. The data pieces P1, P2 and P3 are then each stored in a respective cloud storage environment. Transformation of data A and B to data pieces P1, P2 and P3 may be referred to as an encoding process. The data A and B, which may be considered as a secret, can only be derived when, for example, a party possesses at least two of the three data pieces P1, P2 and P3, and the party must also possess the key that was used to create P1, P2 and P3 from A and B.

Without the key, which defines the relationship between A and B on the one hand, and the data pieces P1, P2 and P3 on the other hand, simply knowing or possessing those data pieces P1, P2 and P3 does not enable the data A and B to be decoded, that is, derived. As well, if the party possesses only one of the data pieces P1, P2 or P3, the party cannot derive the data A and B, even if the party has the key.

Advantageously then, embodiments of the invention may provide various benefits and improvements relative to conventional hardware, systems and methods. To illustrate, embodiments of the invention may improve the operation of a computing system, or element of a computing system, by enabling data read/recovery even when, for example, all of the generated data pieces P1, P2 and P3, corresponding to particular data pieces A and B desired to be read/recovered, are not available. This circumstance may occur, for example, when one cloud of a three cloud environment becomes unavailable for some reason. As another example, embodiments of the invention enable both protection of, and access to, the data in the event that one of the clouds is no longer trusted, such as may occur when a rogue operator gains control of that cloud. In particular, read/write operations coming from the rogue cloud to the other two clouds can be blocked, thus preventing unauthorized data access, without impairing the ability of authorized parties to read or recover the data using the remaining clouds in the environment, since the other two clouds are still available for authorized read/write operations.

A. Aspects of an Example Operating Environment

The following is a discussion of aspects of example operating environments for various embodiments of the invention. This discussion is not intended to limit the scope of the invention, or the applicability of the embodiments, in any way.

As shown in FIG. 1, an embodiment of a data protection environment 600 may include a plurality of clouds. In the particular example of FIG. 1, the data protection environment 600 includes three different cloud storage sites, namely, Cloud 1 602, Cloud 2 604, and Cloud 3 606, although more cloud storage sites can be employed in other embodiments. For example, in another embodiment, five different cloud storage sites are employed. As further indicated in the example of FIG. 1, the data protection environment 600 may comprise, or consist of, a virtual active/active block storage configuration that embraces multiple sites. In some embodiments, at least three different sites are provided.

In general, the cloud storage sites 602 . . . 606 in the group, which may be referred to herein simply as clouds, are physically located close enough to each other enable synchronous replication between the members of the group. By locating the clouds 602 . . . 606 in this way, latency, or response time for read and write operations, is kept to an acceptable limit. As used herein, synchronous replication refers to a process in which data is written to primary storage and a replica simultaneously. In this way, the primary copy and the replica are synchronized in terms of their content. The clouds 602 . . . 606 will each expose a block application program interface (API) to enable data block based storage operations involving the clouds. Each of the clouds 602 . . . 606 is configured and arranged to transmit and receive read/write requests to/from the other clouds, as well as to service read/write requests from clients 202, and to service backup/restore requests from the backup server 300. As noted earlier, the clouds may, but need not, be public clouds such as the Amazon Web Service (AWS) cloud or the Microsoft Azure cloud, or private clouds located at the premises of a customer. No particular type, configuration, or arrangement of clouds is required however.

B. Example Host and Server Configurations

Figure 2:
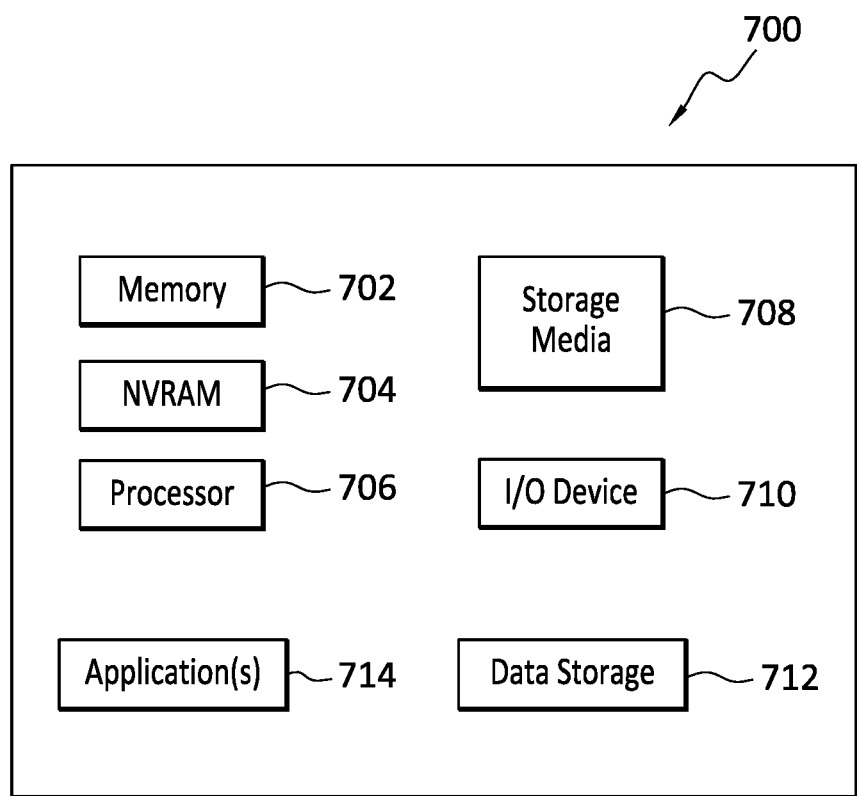
FIG. 2 discloses aspects of an example host configuration.

With reference briefly now to FIG. 2, any one or more of the entities 602, 604, and 606, can take the form of, or include, a physical computing device, one example of which is denoted at 700. As well, where any of the aforementioned elements comprise or consist of a virtual machine (VM), that VM may constitute a virtualization of any combination of the physical components disclosed in FIG. 2.

In the example of FIG. 2, the physical computing device 700 includes a memory 702 which can include one, some, or all, of random access memory (RAM), non-volatile random access memory (NVRAM) 704, read-only memory (ROM), and persistent memory, one or more hardware processors 706, non-transitory storage media 708, I/O device 710, and data storage 712. One or more of the memory components 702 of the physical computing device can take the form of solid state device (SSD) storage. As well, one or more applications 714 are provided that comprise executable instructions. Such executable instructions can take various forms including, for example, instructions executable to perform any method or portion thereof disclosed herein, and/or executable by/at any of a cloud storage site, client, or backup server to encode and decode data as disclosed herein. As well, such instructions may be executable to perform read, write, backup, and restore operations, examples of which are disclosed herein.

C. Example Data Encoding and Decoding Operations

In general, data will be stored in a secret sharing format. As such, none of the data, such as data A and B for example, is stored in its original form. For example, and as noted elsewhere herein, data A and B may be encoded by creating data pieces P1, P2 and P3 that correspond to data A and B. The data pieces P1, P2 and P3 will be stored in different respective clouds, and can be retrieved when needed. As such, the data A and B are the secret, while the mechanism used to generate P1, P2 and P3 is the key. To illustrate further, suppose that a 4 KB block is written in the first cloud, but it is desired to store the data in the 3 clouds, such that any two clouds will have enough information to recover the data, that is, each two clouds store at least 4 KB, and the three clouds collectively store a total of at least 6 KB, and where each cloud alone has no information about the encoded data. The mechanism will thus separate the 4 KB write into two 2 KB chunks, and from those two 2 KB chunks, the mechanism will create three new 2 KB chunks, each of which is to be stored on a respective one of the clouds. In some embodiments, the mechanism used to create data pieces such as P1, P2 and P3 from data, such as data A and B, is implemented as a formula. One example of a formula is a polynomial, such as $P(x)=Ax+B$, where A and B are the data to be encoded, and 'x' is a variable. If it is desired, for example, to encode data A and B by creating three pieces of data corresponding to data A and B, then the values $x=1$, $x=2$, and $x=3$ can be used to generate the data pieces $P(n)$. Using the polynomial, the values of the data pieces are determined to be: $P(1)=A+B$; $P(2)=2A+B$; and, $P(3)=3A+B$. As can be seen, the value of the polynomial at a single point provides no information as to the value of the polynomial at another point. For example, knowing the value of P1 does not provide any insight as to the value of P2 and, as such, likewise fails to provide any insight as to data A and B. On the other hand, if, for example, P1 and P2 are known, P3 can be determined, and once P1, P2 and P3 are known, then A and B can be derived, or decoded, using the polynomial. Some of these concepts can be further illustrated with an analogy. It is noted that this math may be implemented over a finite field so that the presentation of the elements after the multiplication will be of the same size.

In the preceding example, the polynomial is in the form of an equation for a line. As such, once two points, such as the values P1 and P2 for example, of the line are known, any other point on the line, such as P3 for example, can be determined. For example, if $P1=6$, and $P2=8$, then it is known that $A+B=6$, and $2A+B=8$. From these relations, it can be determined that $A=2$ and, thus, $B=4$. On the other hand, and continuing with the line analogy, if the value of only one point, such as P1 for example, is known, there are an infinite number of lines that pass through that point and, accordingly, there is not yet enough information to determine P2 and/or P3. As such, in this example, at least two values of the polynomial must be known to decode A and B.

It should be noted that the scope of the invention is not limited to the disclosed examples, or to polynomials as a mechanism for encoding/decoding data. For example, in some alternative embodiments, Reed-Solomon codes may be used for the encoding/decoding of data.

D. Example Data Encoding and Decoding Operations

With the foregoing discussion in view, details are now provided concerning various aspects of read and write commands involving encoded data. In the example of a write command, a write command may be issued by a cloud, application, client, or other entity, and the write command may be directed to a cloud, client, backup/restore server, or other entity. When a write command arrives at an entity, such as a write command for data A and B for example, the entity may then encode data A and B, such as by calculating 3 different values of a polynomial to generate corresponding data pieces P1, P2 and P3, for example.

In more detail, and with continued reference to the aforementioned example, the write command arrives at a single site, such as one of the cloud sites, and the write command data is then separated at that site into two pieces A and B, which are then encoded by the creation of three new pieces based on those initial two pieces. In some instances, it may be assumed that the write granularity is a multiple of 4 KB, for example, and for each 4 KB of write data, that write data will be separated into two 2 KB pieces, and then encoded by the creation of three new pieces. This example is presented only by way of illustration however, and different write granularity values, and different numbers of encoded pieces, can be used in other embodiments.

Each of the three new data pieces P1, P2 and P3 is then sent to a different respective entity for storage. As disclosed herein, each of the entities may be a cloud storage site, although that is not necessarily required. The write operation is considered to be completed when the three data pieces have arrived at their respective storage sites. In one variation, a write operation may be considered to be complete when, after waiting synchronously, fewer than all of the data pieces, such as only two data pieces for example, have been stored at their respective storage sites.

The storing of the encoded data may be relatively efficient. For example, only 1.5 times the data A and B is needed to be stored in order to enable survival of a failure of one of the three clouds. That is, the 2 pieces of data A and B are used to generate 3 pieces of data, for example, 1a+b, 2a+b, 3a+b, that will be stored. This is done in a finite field so the amount of bits remains the same, and in the multiplication will not be by 2,3 it will be by some elements of the finite field. To illustrate, in some finite fields there is no element 2,3, but there are other elements. For example, there is a finite field with two elements 0,1 where 0+1=1, 1+1=0, 0+0=0, 1*0=0, 1*1=1, and 0*0=0 but there is no 2,3 in this field. In some embodiments of the invention, the fields will be with 2^n elements but 2,3 will not be there, that is, 1+1=0 in the field presented. In this way, the amount of information kept is 3 pieces of information for every two pieces encoded. For example a 4 KB block can be stored by storing 2 KB of data in each of three different clouds so that, in the aggregate, 6 KB are stored. As well, 6 KB is the minimum amount of data that must be stored, since each of the three clouds must store 2 KB in order to enable decoding of the 4 KB block.

Once the data pieces have been stored, they can then be read out and the associated data decoded. In general, a read command may be a standard read to a block storage, and the read command will then be translated to multiple read commands, each of which is directed to a particular site, such as a cloud site for example. For the purposes of demonstration, but not limitation, it is assumed that the read size is a multiple of 4 KB and thus, for each 4 KB, two pieces of p1, p2, and p3 will be read from two of the 3 clouds.

In more detail, and with reference to the three cloud example, a read command may be issued to each of the three clouds by an entity such as a client, backup server, another cloud, or other entity. The read command will not identify the data A and B directly, but will refer to the encoded version of A and B, namely, P1, P2 and P3. The same read command may be sent to each cloud storage site, and all of the read commands may refer to P1, P2 and P3. The read command can be targeted at any two of the cloud storage sites. At such time as two out of the 3 pieces P1, P2, and P3 are returned, the data A, B can be decoded and, thus, the 4 KB data is decoded. For example, Cloud 1 602 may store only the data piece P1 but receives a read request identifying P1, P2 and P3. As such, Cloud 1 602 will return only P1 since only P1 is stored at Cloud 1 602. The other clouds, Cloud 2 604 and Cloud 3 606 will reply in corresponding fashion. In another embodiment, three different read commands may be transmitted, each of the read commands targeting a particular data piece stored at a particular cloud storage site.

Regardless of the number or form of read commands, the data A and B can be accessed, that is, decoded, when two of the cloud storage sites are accessed and any two data pieces of P1, P2 and P3 are returned in response to the read command. The system may be configured so that after two of the data pieces are returned, the response of the third cloud storage site is nullified and the third data piece is not returned. This approach may help to eliminate unnecessary data transactions.

It is noted here that the scope of the invention is not limited to read and/or write operations that involve only three pieces of data, such as the example of P1, P2 and P3 disclosed herein. Rather, the scope of the invention extends more generally to any number of data pieces that may be generated as a result of an encoding process. In one particular alternative embodiment, an encoding process generates five data pieces, and only three of the five data pieces are needed to decode the associated data.

As noted herein, and demonstrated by the aforementioned example of a read command, embodiments of the invention provide for reliable availability of data, even when all of the data pieces associated with that data cannot be accessed for one reason or another. Thus, and with reference to the aforementioned example, even if one of the cloud storage sites is unavailable or inaccessible for any reason, the availability of the data is not compromised, since the data can be reconstructed using only two of the data pieces.

Not only do embodiments of the invention provide for improved availability of data, but those embodiments also provide for improved data security. To briefly illustrate, if one of the clouds in a group of clouds is no longer trusted because the data in it is compromised, embodiments of the invention are able to block all read access commands arriving from that cloud, at the other two clouds that host data. This means that even if the environment in the cloud is fully compromised such that someone has full access to all the virtual machines and all of the storage at that cloud, that person actually has little or no information about the stored data. The only information relating to the stored data that may be accessible to the rogue operator is information that may be stored in the cache of a virtual machine at the compromised cloud. However, the amount of data in the VM cache is typically negligible compared to the full storage contents and thus would likely provide little, or no, insight to a rogue operator concerning the stored data. Moreover, even if the rogue cloud is disconnected, availability of the data is not impaired, since the remaining clouds have adequate information available, to an authorized user, to enable decoding of the data.

E. Aspects of Example Methods for Data Encoding/Decoding

Figure 3:
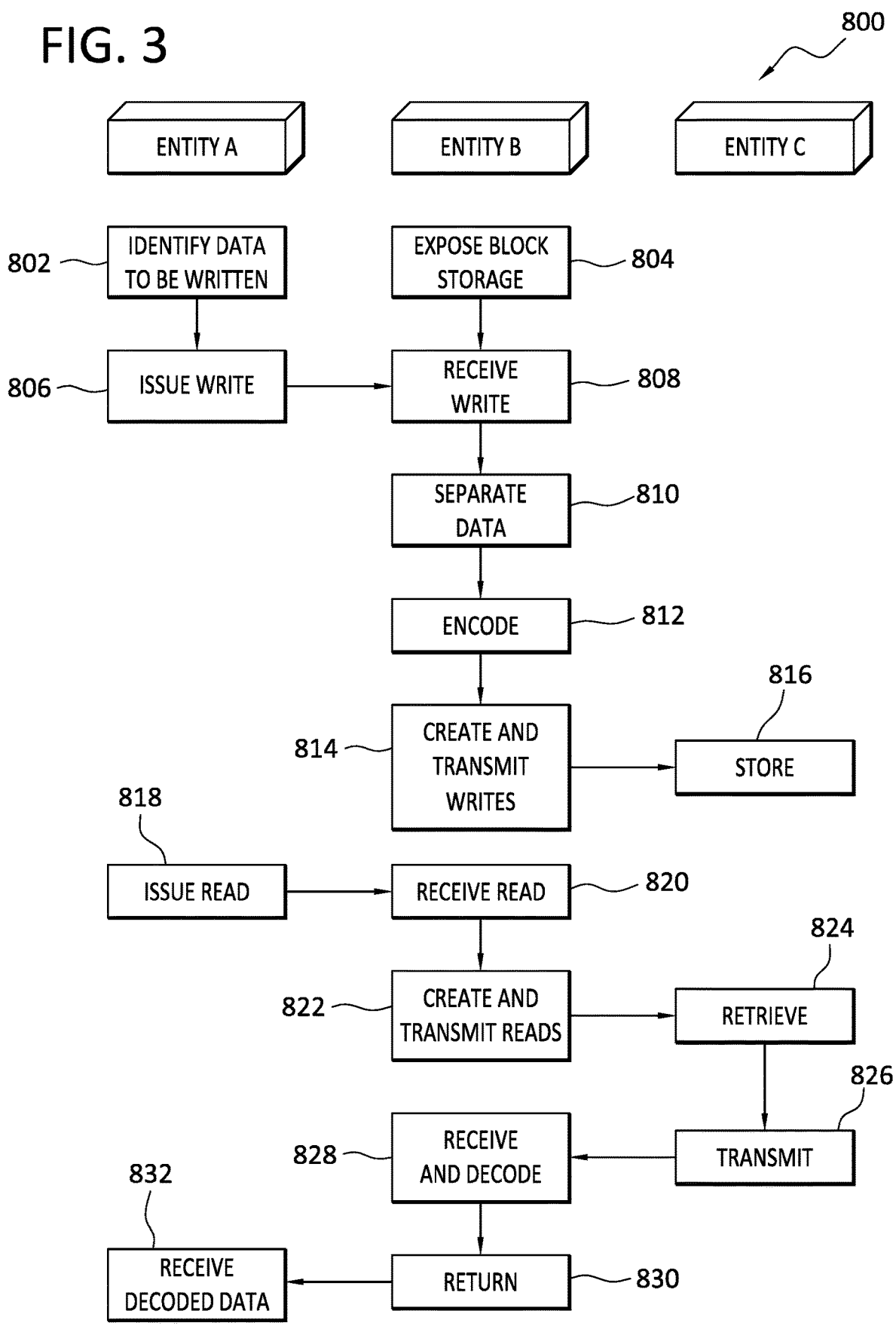
FIG. 3 is a flow diagram that discloses aspects of some example methods for coding, storing, retrieving, and/or decoding data.

With attention now to FIG. 3, details are provided for some example methods for data encoding and decoding, where one example embodiment of such a method is denoted generally at 800. One, some, or all, of the processes disclosed in method 800 may be performed on a block level basis. To illustrate with one example, data may be encoded and decoded on a block level basis. More generally however, the scope of the invention is not limited to block level processes and may be performed at other, such as lower, levels of data granularity instead of where data pieces larger than blocks are involved.

The method 800 may begin when a first entity 'A', such as a client or client application, or other entity disclosed herein, identifies data that is desired to be stored 802. As indicated below, the first entity 'A' sees a block storage interface exposed by the second entity. Thus, the first entity can write data to the block storage that has been exposed by the second entity, and the second entity, or other entity receiving the write request, translates the write into separate respective writes to, for example, three different cloud sites. At any suitable time, the second entity 'B' may expose a block storage interface 804 that is visible to the first entity 'A.' In general however, the block storage interface should be exposed 804 in time for visibility to the second entity 'B' before the second entity issues a write request 806, which may be referred to herein as a primary write request, identifying data that is desired to be written. The write request is then received 808 by the second entity. In some alternative embodiments, the same entity may issue the write request and perform the data encoding.

After receipt of the write request 808, the second entity may then separate the data 810 identified in the write request into multiple data pieces, which may be of uniform size. The data pieces need not have any particular size. In some embodiments, the data pieces may all be a particular size, such as 4 KB for example. However, the data identified in the write request may be separated 810 into pieces larger, or smaller, than 4 KB. Accordingly, the scope of the invention is not limited to the 4 KB example data piece size.

After the data has been separated 810 into data pieces, the data pieces are then encoded 812. The data may be encoded 812 in any manner disclosed herein such as, for example, through the use of a polynomial, although that is not necessarily required. In some embodiments, the data may be encoded 812 in such a way as to create a number 'n' of data pieces that is greater than the number of data pieces that were encoded. As well, the number 'n' of data pieces created may be such that <n data pieces are needed to decode the encoded data.

After the data has been encoded, a respective write request, which may be referred to herein as a secondary write request, is generated for each data piece and the write requests are then transmitted 814 to entity 'C' which may comprise respective storage sites, one, some, or all, of which may be cloud storage sites in some embodiments. In some embodiments, each of 'n' data pieces is transmitted 814 to a different respective storage site which may be geographically disparate, and/or otherwise isolated, from each other. In any case, the data pieces are then stored 816 at the respective storage sites to which they were transmitted, which may comprise respective cloud storage sites for example.

At some point in time after the data pieces produced by the encoding process are stored 816, a read request, which may be referred to herein as a primary read request, may be issued 818 that identifies, or simply implicates, the data that was encoded. The read request may, or may not, be issued by the same entity that issued the write request 806. The read request may be received 820 by the second entity, which creates a respective read request for each data piece identified in the read request, and then transmits 822 the read requests to the third entity, which may comprise one or more storage sites. The third entity receives the read requests and retrieves 824 the data pieces that correspond with the read request. In one alternative embodiment, the read requests may be transmitted directly to the storage site(s) where the data pieces created by the encoding process are stored.

As noted herein, the read request 820 may take the form of a single read request that identifies all the data pieces generated by the encoding process. On the other hand, multiple secondary read requests may be created 822 and sent to respective storage sites, where each of the secondary read requests identifies a particular data piece that was generated by the encoding process.

Note that although there may be awareness, in some embodiments, at a given storage site of the identity of the data as A or B, for example, that storage site does not hold all the data pieces needed to reconstruct, or decode, A and B. Thus, the data A and B cannot be accessed at the storage site, even if that data is partly or fully identified at that storage site. To illustrate, simply knowing that a file has filename 'X' does not convey access to the contents of that file.

After the stored data pieces have been retrieved 824, the data pieces can then be transmitted 826. In some embodiments, the retrieved data pieces are transmitted 826 to the same entity that issued the read request. Additionally, or alternatively, the retrieved data pieces may be transmitted 826 to one or more other entities, such as any of the entities disclosed herein.

Upon receipt at a decoding entity, which may be any of the disclosed entities, the retrieved data pieces can be used to decode 828 the data based upon which the retrieved data pieces were generated. As disclosed herein, decoding 828 can be performed using fewer than all of the data pieces that were generated. To illustrate, if data were encoded by creating three associated data pieces, it is possible to decode that data using only two of those data pieces. The decoding 828 of the data can be performed at any of the entities disclosed herein.

If the decoded data is to be sent to an entity other than the entity that performed the decoding, the method 800 advances to 830 where the decoded data is returned to, and received by 832, for example, the entity that initiated the read request.

It should be noted that, with respect to the disclosure of FIG. 3, as well as the rest of the present disclosure, that the functional allocation among entities A, B and C is presented only by way of example and is not intended to limit the scope of the invention in any way. In alternative embodiments, the functionalities disclosed herein can be allocated in ways other than as shown, for example, in FIG. 3.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   exposing a block storage which is distributed across a group of multiple sites;
   receiving a primary write request that identifies data to be stored;
   separating data identified in the primary write request into 'n' data pieces, where 'n'≥2;
   encoding the 'n' data pieces by creating multiple new blocks of data, and each of the new blocks of data comprises a different respective combination of the 'n' data pieces, where the data pieces are encoded in such a way that when a sufficient number, but fewer than all, of the multiple new blocks of data are retrieved, the data identified in the write request is recoverable with a key that was used to encode the 'n' data pieces; and
   writing the new blocks of data to different respective sites of the group, where writing of the new blocks of data is performed in conjunction with a plurality of secondary write requests, each of which corresponds to one of the new blocks of data.

2. The method as recited in claim 1, wherein encoding the data pieces comprises using a polynomial to determine respective values of the data pieces.

3. The method as recited in claim 1, wherein the group of multiple sites comprises a virtual active/active block storage configuration.

4. The method as recited in claim 1, wherein a single site that stores a new block of data has no information concerning the data identified in the write request.

5. The method as recited in claim 1, wherein decoding commences after a sufficient number, but fewer than all, of the new blocks of data are received at a decoding entity.

6. The method as recited in claim 1, wherein decoding the data identified in the write request comprises using a polynomial and the received new blocks of data to derive the data pieces.

7. The method as recited in claim 1, further comprising:
   receiving a primary read command concerning the stored data;
   translating the primary read command into multiple different secondary read commands; and
   transmitting each of the secondary read commands to a respective site of the group of sites, and each of the secondary read commands refers to one or more of the new blocks of data created by the encoding process.

8. The method as recited in claim 7, further comprising:
   collectively receiving, from fewer than all of the sites, a sufficient number of the new blocks of data to enable decoding of the data identified in the primary read command, where the sufficient number of the new blocks of data is fewer than all of the new blocks of data; and using the received new blocks of data, and a polynomial, to decode the data identified in the write request.

9. The method as recited in claim 1, further comprising blocking a read access command issued by one of the sites, while maintaining access to the new blocks of data from the other sites.

10. The method as recited in claim 1, wherein a write operation associated with the write request is considered complete when enough of the 'n' corresponding data pieces have been written so as to enable, when read out, decoding of the 'x' pieces of data.

11. A non-transitory storage medium having stored therein computer-executable instructions which, when executed by one or more hardware processors, perform the following operations:

exposing a block storage which is distributed across a group of multiple sites;

receiving a primary write request that identifies data to be stored;

separating data identified in the primary write request into 'n' data pieces, where 'n'≥2;

encoding the 'n' data pieces by creating multiple new blocks of data, and each of the new blocks of data comprises a different respective combination of the 'n' data pieces, where the data pieces are encoded in such a way that when a sufficient number, but fewer than all, of the multiple new blocks of data are retrieved, the data identified in the write request is recoverable with a key that was used to encode the 'n' data pieces; and writing the new blocks of data to different respective sites of the group, where writing of the new blocks of data is performed in conjunction with a plurality of secondary write requests, each of which corresponds to one of the new blocks of data.

12. The non-transitory storage medium as recited in claim 11, wherein encoding the data pieces comprises using a polynomial to determine respective values of the data pieces.

13. The non-transitory storage medium as recited in claim 11, wherein the group of multiple sites comprises a virtual active/active block storage configuration.

14. The non-transitory storage medium as recited in claim 11, wherein a single site that stores a new block of data has no information concerning the data identified in the write request.

15. The non-transitory storage medium as recited in claim 11, wherein decoding commences after a sufficient number, but fewer than all, of the new blocks of data are received at a decoding entity.

16. The non-transitory storage medium as recited in claim 11, wherein decoding the data identified in the write request comprises using a polynomial and the received new blocks of data to derive the data pieces.

17. The non-transitory storage medium as recited in claim 11, wherein the operations further comprise:

receiving a primary read command concerning the stored data;

translating the primary read command into multiple different secondary read commands; and transmitting each of the secondary read commands to a respective site of the group of sites, and each of the secondary read commands refers to one or more of the new blocks of data created by the encoding process.

18. The non-transitory storage medium as recited in claim 17, wherein the operations further comprise:

collectively receiving, from fewer than all of the sites, a sufficient number of the new blocks of data to enable decoding of the data identified in the primary read command, where the sufficient number of the new blocks of data is fewer than all of the new blocks of data; and using the received new blocks of data, and a polynomial, to decode the data identified in the write request.

19. The non-transitory storage medium as recited in claim 11, wherein the operations further comprise blocking a read access command issued by one of the sites, while maintaining access to the new blocks of data from the other sites.

20. The non-transitory storage medium as recited in claim 11, wherein a write operation associated with the write request is considered complete when enough of the 'n' corresponding data pieces have been written so as to enable, when read out, decoding of the 'x' pieces of data.

* * * * *

UNITED STATES PATENT AND TRADEMARK OFFICE
CERTIFICATE OF CORRECTION

PATENT NO. : 10,936,406 B2
APPLICATION NO. : 16/155772
DATED : March 2, 2021
INVENTOR(S) : Saar Cohen et al.

Page 1 of 1

It is certified that error appears in the above-identified patent and that said Letters Patent is hereby corrected as shown below:

In the Claims

Column 10
Claim 1, Line 30, change "where the data pieces" to – where the 'n' data pieces –

Column 11
Claim 10, Line 15, change "the 'x' pieces of data" to – the 'n' pieces of data –

Column 11
Claim 11, Line 29, change "where the data pieces" to – where the 'n' data pieces –

Column 12
Claim 20, Line 44, change "the 'x' pieces of data" to – the 'n' pieces of data –

Signed and Sealed this
Fifth Day of April, 2022

Drew Hirshfeld
*Performing the Functions and Duties of the
Under Secretary of Commerce for Intellectual Property and
Director of the United States Patent and Trademark Office*